Oct. 13, 1925.
W. T. HULSCHER
STRAINER
Filed Oct. 6, 1924
1,556,993
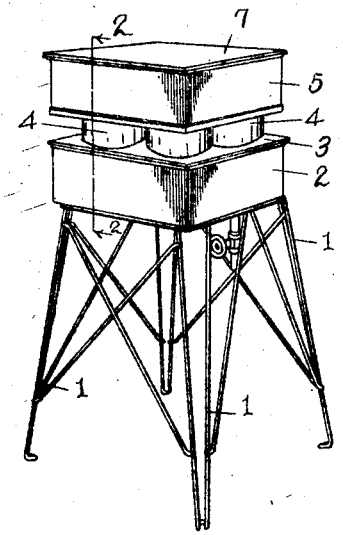
Fig. I.
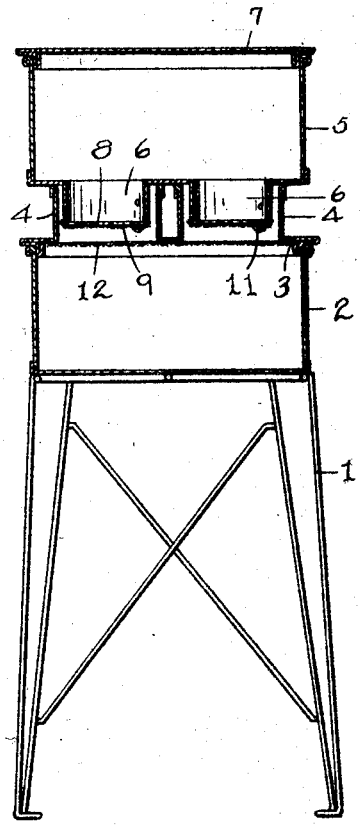
Fig. II.
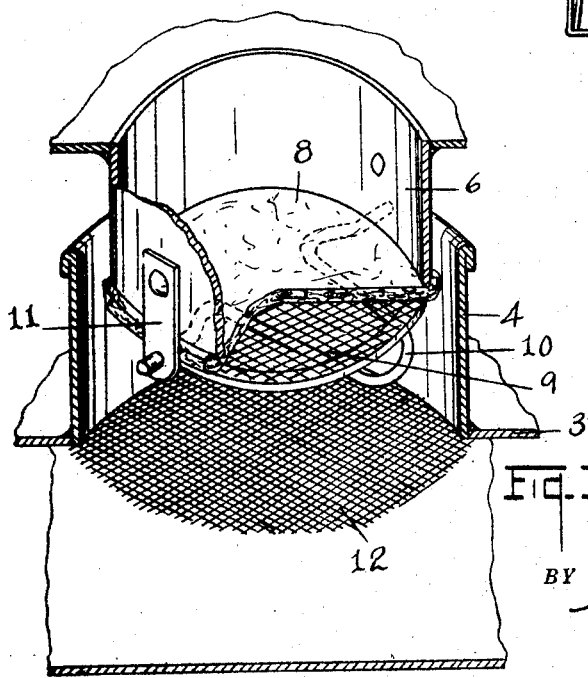
Fig. III.
INVENTOR
William T. Hulscher
BY Chappell Teal
ATTORNEYS Patented Oct. 13, 1925.

1,556,993

UNITED STATES PATENT OFFICE.

WILLIAM T. HULSCHER, OF BATTLE CREEK, MICHIGAN.

STRAINER.

Application filed October 6, 1924. Serial No. 741,962.

*To all whom it may concern:*

Be it known that I, WILLIAM T. HULSCHER, citizen of the United States, residing at 243 Champion St., Battle Creek, Michigan, have invented certain new and useful Improvements in Strainers, of which the following is a specification.

This invention relates to improvements in strainers.

My improved strainer is especially designed by me for straining paint and like materials, although adapted for straining and filtering other materials, particularly heavy or relatively thick materials.

The main object of this invention is to provide an improved strainer for paint and like materials which is efficient and of large capacity in proportion to its size.

Objects pertaining to details and economies of my invention will definitely appear from the detailed description to follow.

I accomplish the objects of my invention by the devices and means described in the following specification. The invention is clearly defined and pointed out in the claims.

A structure embodying the features of my invention is clearly illustrated in the accompanying drawing forming a part of this application, in which:

Fig. I is a perspective view of a strainer embodying the features of my invention.

Fig. II is a vertical section on a line corresponding to line 2—2 of Fig. I.

Fig. III is a detail perspective view, partially in section, further illustrating structural details.

In the drawing similar numerals of reference indicate similar parts in all of the views.

Referring to the drawing, the embodiment illustrated is a portable apparatus and I preferably provide a stand designated generally by the numeral 1. This stand is adapted to receive a receiving receptacle or tank 2. This tank has a cover 3 provided with a plurality of openings having upwardly projecting flanges 4 about the openings.

The supply receptacle 5 has a plurality of discharge necks 6 of such diameter that they may be arranged within the flanges 4 with the bottom of the receptacle 5 resting upon the flanges.

The receptacle 5 is provided with a removable cover 7. Each discharge neck 6 is provided with a filtering pad 8 of cotton or other suitable material, the pad being supported and clamped upon the lower edge of the neck by means of the foraminated disk 9 which is removably supported by the clamp 10, the ends of the clamp being adapted to engage depending ears 11 on the neck.

A screen 12 is secured on the under side of the cover 3 so that it is common to all of the openings in the cover. The main purpose of this screen 12 is to collect any pieces of the filtering pad that might become detached, it not being intended that the screen 12 shall collect any material that will pass through the filtering pad.

With this arrangement of parts I provide a strainer for paint and like materials which is of large capacity and is very efficient. The filtering material or pads may be easily renewed as occasion may require.

Having thus described my invention what I claim as new and desire to secure by Letters Patent is:

1. In a strainer, the combination of a receiving receptacle, a cover therefor provided with a plurality of flanged openings, a screen common to all of said openings disposed on the under side of said cover, a supply receptacle provided with a plurality of discharge necks depending into said flanges of said cover, filtering pads disposed over the ends of said necks, foraminated supporting members for said filtering pads, and means for removably clamping said supporting members in position.

2. In a strainer, the combination of a receiving receptacle, a cover therefor provided with a plurality of flanged openings, a screen common to all of said openings disposed on the under side of said cover, a supply receptacle provided with a plurality of discharge necks depending into said flanges of said cover, and filtering pads for said necks.

3. In a strainer, the combination of a receiving receptacle, a cover therefor provided with a plurality of flanged openings, a supply receptacle provided with a plurality of discharge necks depending into said flanges of said cover, filtering pads disposed over the ends of said necks, foraminated supporting members for said filtering pads, and means for removably clamping said supporting members in position.

4. In a strainer, the combination of a receiving receptacle, a cover therefor provided with a plurality of flanged openings, a supply receptacle provided with a plurality of discharge necks depending into said flanges of said cover, and filtering pads for said necks.

5. In a strainer, the combination of a receiving receptacle, a removable cover therefor provided with a flanged opening, a screen for said opening disposed on the under side of said cover, a supply receptacle adapted to rest on said flange and provided with a discharge neck depending into said flange of said cover, a filtering pad disposed over the end of said neck, a foraminated supporting member for said filtering pad, and means for removably clamping said supporting member in position.

6. In a strainer, the combination of a receiving receptacle, a removable cover therefor provided with a flanged opening, a supply receptacle adapted to rest on said flange and provided with a discharge neck depending into said flange of said cover, a filtering pad disposed over the end of said neck, a foraminated supporting member for said filtering pad, and means for removably clamping said supporting member in position.

7. In a strainer, the combination of a receiving receptacle, a removable cover therefor provided with a flanged opening, a screen for said opening disposed on the under side of said cover, a supply receptacle adapted to rest on said flange and provided with a discharge neck depending into said flange of said cover, and a filtering means detachably secured to said neck.

8. In a strainer, the combination of a receiving receptacle, a removable cover therefor provided with a flanged opening, a supply receptacle adapted to rest on said flange and provided with a discharge neck depending into said flange of said cover, and a filtering means detachably secured upon the end of said neck.

In witness whereof I have hereunto set my hand.

WILLIAM T. HULSCHER.